United States Patent
Amarnathan

(10) Patent No.: US 11,940,541 B2
(45) Date of Patent: Mar. 26, 2024

(54) GNSS ANTI-JAMMING USING INTERFERENCE CANCELLATION

(71) Applicant: Honeywell International Inc., Charlotte, NC (US)

(72) Inventor: Mohandas Amarnathan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 167 days.

(21) Appl. No.: 17/144,400

(22) Filed: Jan. 8, 2021

(65) Prior Publication Data

US 2022/0163676 A1 May 26, 2022

(30) Foreign Application Priority Data

Nov. 24, 2020 (IN) .............................. 202011051101

(51) Int. Cl.
*G01S 19/21* (2010.01)
*H04B 1/10* (2006.01)
*H04K 3/00* (2006.01)

(52) U.S. Cl.
CPC ............ *G01S 19/21* (2013.01); *H04B 1/1027* (2013.01); *H04B 1/109* (2013.01); *H04K 3/228* (2013.01); *H04K 3/90* (2013.01)

(58) Field of Classification Search
CPC ....... G01S 19/21; G01S 19/215; H04K 3/228; H04K 3/90; H04B 1/1027; H04B 1/109
See application file for complete search history.

(56) References Cited

U.S. PATENT DOCUMENTS 5,410,750 A * 4/1995 Cantwell .............. H04B 1/7102
375/349
5,699,045 A 12/1997 Frederick et al.
(Continued)

FOREIGN PATENT DOCUMENTS

| WO | 2012105747 A1 | 8/2012 | |
|---|---|---|---|
| WO | 2015021481 A2 | 2/2015 | |
| WO | WO-2018206246 A1 * | 11/2018 | .............. B60L 58/10 |

OTHER PUBLICATIONS

Hurst, P.J., & Norrell, A. (2008). DAC Quantization-Noise Cancellation in an Echo-Canceling Transceiver. IEEE Transactions on Circuits and Systems II: Express Briefs, 55, pp. 5. (Year: 2007).*
(Continued)

*Primary Examiner* — Gregory C. Issing
(74) *Attorney, Agent, or Firm* — Fogg & Powers LLC

(57) ABSTRACT

Systems and methods for GNSS anti-jamming using interference cancellation are described herein. In certain embodiments, a system includes an antenna that receives signals, wherein the signals comprise a weak portion associated with one or more GNSS satellites and a strong interference portion from an interfering signal source. The system also includes a GNSS anti-jammer. The GNSS anti-jammer includes an interference isolator that receives the received signals and provides an estimated strong interference portion as an output. The GNSS anti-jammer also includes a summer that subtracts the estimated strong interference portion from the received signals to create a summed signal. Further, the GNSS anti-jammer includes a local noise remover that removes noise generated by the interference isolator from the summed signal, wherein the local noise remover is a processor that digitally removes the noise. Further, the system includes a GNSS receiver coupled to receive the summed signal from the processor.

7 Claims, 6 Drawing Sheets

(56) References Cited

U.S. PATENT DOCUMENTS

| | | | |
|---|---|---|---|
| 6,724,840 B1 | 4/2004 | Osofsky et al. | |
| 6,819,911 B2 * | 11/2004 | Clelland | H04B 1/1027 |
| | | | 455/296 |
| 7,656,933 B2 | 2/2010 | Klinke et al. | |
| 7,660,374 B2 | 2/2010 | Casabona et al. | |
| 8,922,401 B1 | 12/2014 | Narumi | |
| 9,059,768 B1 | 6/2015 | Sorsby et al. | |
| 9,391,654 B2 | 7/2016 | Wyckoff et al. | |
| 10,419,048 B2 * | 9/2019 | Goodson | H04L 23/02 |
| 10,574,288 B2 | 2/2020 | Dafesh et al. | |
| 10,873,353 B2 * | 12/2020 | Liu | B60L 58/18 |
| 2017/0134074 A1 | 5/2017 | Dural et al. | |

OTHER PUBLICATIONS

Politis et al., "Weak Interference Detection With Signal Cancellation In Satellite Communications", ICASSP 2017, pp. 6289 through 6293, IEEE.

European Patent Office, "Extended European Search Report from U.S. Appl. No. 17/144,400, filed May 19, 2022", from Foreign Counterpart to U.S. Appl. No. 17/144,400, filed May 19, 2022, pp. 1 through 9, Published: EP.

* cited by examiner

US 11,940,541 B2

GNSS ANTI-JAMMING USING INTERFERENCE CANCELLATION

CROSS-REFERENCE TO RELATED APPLICATION

This application claims benefit of Indian Provisional Patent Application Serial No. 202011051101, same title herewith, filed on Nov. 24, 2020, which is incorporated in its entirety herein by reference.

BACKGROUND

Many navigation systems receive measurements from satellites in a global navigation satellite system (GNSS). These navigation systems use the signals from the GNSS satellites to determine position and velocity information of an associated object, such as an aircraft, boat, automobile, personal electronic device, or other moving objects. These navigation systems also use measurements acquired from the GNSS signals to bound drifts in measurements obtained from different sensors coupled to a navigation system.

Recently, the integrity, accuracy, and performance of navigation systems that use GNSS signals have come under threat because of the rise of GNSS jamming activities. GNSS jamming activities occur when a device other than the GNSS satellites transmits signals near the frequencies of the GNSS signals, where the interfering signals are stronger than the GNSS signals. The interfering signals potentially interfere with the accurate reception of the authentic GNSS signals.

SUMMARY

Systems and methods for GNSS anti-jamming using interference cancellation are described herein. In certain embodiments, a system includes an antenna that receives signals, wherein the signals comprise a weak portion associated with one or more GNSS satellites and a strong interference portion from an interfering signal source. The system also includes a GNSS anti-jammer. The GNSS anti-jammer includes an interference isolator that receives the received signals and provides an estimated strong interference portion as an output. The GNSS anti-jammer also includes a summer that subtracts the estimated strong interference portion from the received signals to create a summed signal. Further, the GNSS anti-jammer includes a local noise remover that removes noise generated by the interference isolator from the summed signal, wherein the local noise remover is a processor that digitally removes the noise. Further, the system includes a GNSS receiver coupled to receive the summed signal from the processor.

DRAWINGS

Drawings accompany this description and depict only some embodiments associated with the scope of the appended claims. Thus, the described and depicted embodiments should not be considered limiting in scope. The accompanying drawings and specification describe the exemplary embodiments and features thereof, with additional specificity and detail, in which:

Figure 1:
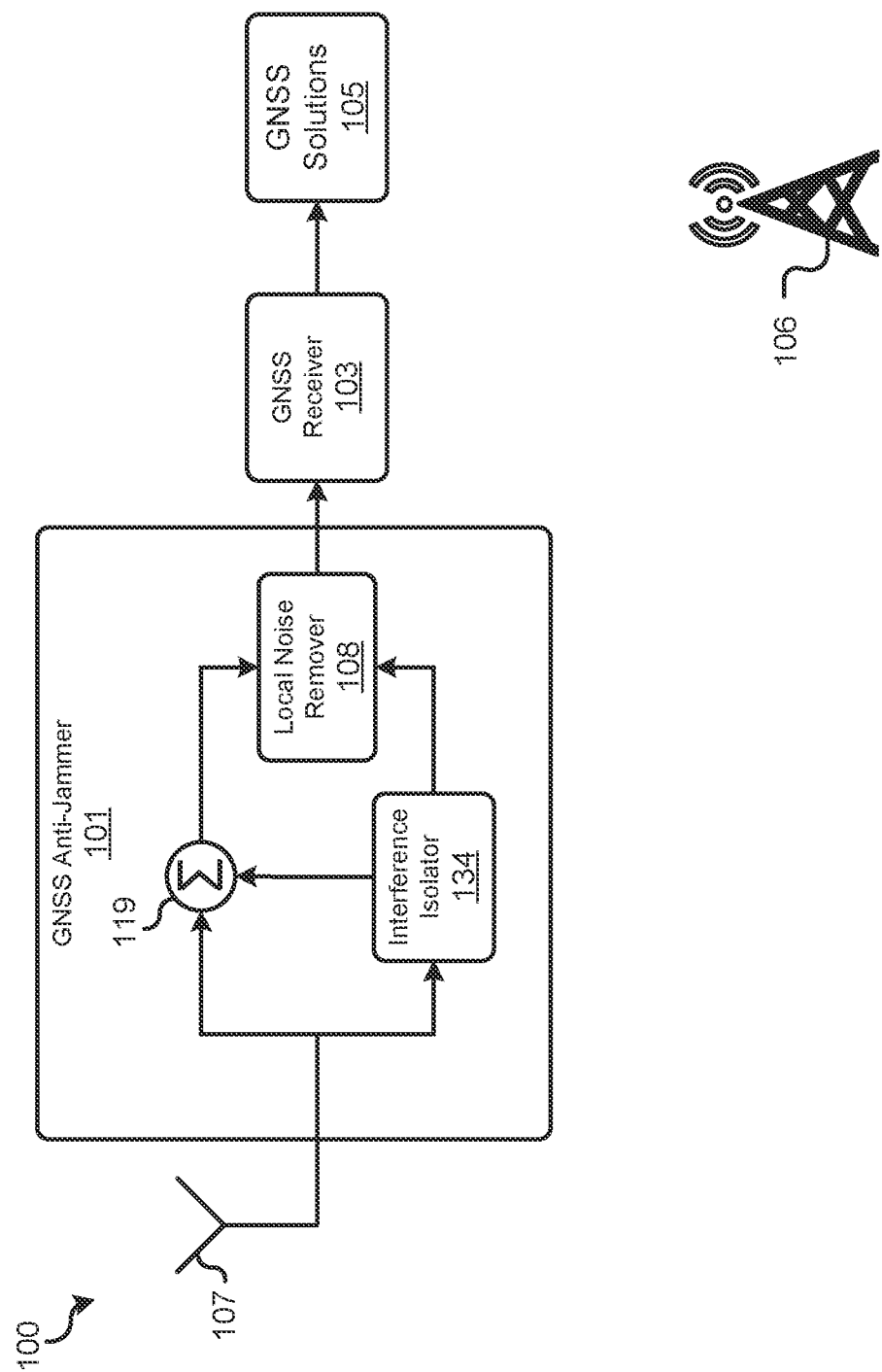
FIG. 1 is a block diagram illustrating a system for providing GNSS anti-jamming using interference cancellation according to an aspect of the present disclosure.

Under common practice, the various described features are not drawn to scale but are drawn to emphasize specific features relevant to the example embodiments.

DETAILED DESCRIPTION

In the following detailed description, reference is made to the accompanying drawings that form a part of the present description, and in which is shown, through illustration, specific illustrative embodiments. However, it is to be understood that other embodiments may be used and that logical, mechanical, and electrical changes may be made.

The present disclosure describes systems and methods for providing GNSS anti-jamming using interference cancellation. In particular, the systems and methods cancel an interfering signal in the analog domain to ensure: that the interfering signal does not compromise the GNSS receiver's dynamic range. The system extracts the interfering signal from the received signals and subtracts the interfering signal from the received signal in the analog domain. The system then provides the signal lacking the interfering signal to a GNSS receiver.

In some situations, a GNSS receiver may be used in an environment containing an interfering signal source. For example, when in the presence of the interfering signal source, the GNSS receiver can receive signals that include the GNSS signals from GNSS satellites and interfering signals from the interfering signal source. The signals received at the antenna may be represented by the following equation:

$$s(t) = \sqrt{(2^*P_s)} D(t) C(t) \cos(2\pi f_c t + \varnothing) + w_{\partial 1}(t) + J(t) \qquad (1)$$

As shown in the equation, s(t) represents the signal received through the antenna. $P_s$ represents the power of the received signal, which can typically be about −130 dBm. The D(t) represents the coarse/acquisition (C/A) and the C(t) represents the navigation data, which can include modulated binary phase shift keyed symbols at a 50 Hz symbol rate. $f_c$ represents the carrier frequency, which may be substantially equal to a frequency produced by a local oscillator in the GNSS receiver that is used for demodulation of s(t) and Ø represents the phase of the carrier. $w_{\partial 1}(t)$ represents additive white Gaussian noise (AWGN) noise with a $\partial_1$ variance and a mean $\mu_1$. The J(t) represents the interfering signal produced by the interfering signal source.

An interfering signal source may emit a signal near the frequencies of the GNSS signals from the GNSS satellites. However, as the interfering signal source is substantially closer to the GNSS receiver than the GNSS satellites, the strength of the interfering signal received from the interfering signal source can be stronger than the GNSS signals received from the GNSS satellites. Accordingly, the GNSS receiver may receive signals that include a weak portion associated with the GNSS satellites and a strong interference portion associated with the interfering signal source.

The higher strength of the interfering signals received from the interfering signal source can negatively affect the operation of the GNSS receiver. For example, as the frequencies of the interfering signals from the interfering signal source are close to the frequency of the GNSS signals from the satellites, the filtering of the signals received by the GNSS receiver may pass the interfering signals along with the GNSS signals. As the strength of the interfering signals is greater than the strength of the GNSS signals, the signal can potentially saturate amplifiers and/or ADCs within the GNSS receiver. The saturated components within the GNSS receiver may cause a loss of data in the signals produced by the GNSS receiver.

FIG. 1 is a block diagram illustrating a system 100 for providing GNSS anti-jamming using interference cancellation. The system 100 receives GNSS signals and produces GNSS solutions 105. A larger navigation system may incorporate the system 100 and use the produced GNSS solutions 105 to create navigation solutions. The navigation solutions may describe the position, attitude, velocity, and other navigation information for a vehicle. The vehicle may be a boat, an automobile, a spacecraft, a missile, or other vehicle type. The GNSS solutions 105 may also apply to other movable objects, such as personal electronic devices, tracking devices, and other movable objects.

As used in this description, a GNSS includes multiple satellites that orbit the earth and transmit signals. The system 100 includes a GNSS receiver that receives the transmitted signals and calculates position and velocity information when receiving signals from four or more GNSS satellites. For example, the GNSS receiver may calculate pseudo-range, delta-range, carrier measurements, and C/No. A particular GNSS may include one or more of the United States developed Global Position System (GPS), the Russian developed Global Navigation Satellite System (GLONASS), the European Union developed Galileo system, and the Chinese Developed BeiDou system, among other global or regional satellite navigation systems.

The system 100 receives signals through an antenna 107. The antenna 107 may include multiple antennas or a single antenna. To provide GNSS anti jamming using interference cancellation, the system 100 includes GNSS anti-jammer 101. The GNSS anti-jammer 101 may be hardware, software, or combination of software and hardware that receives signals through the antenna 107, where the signals include a weak portion that includes GNSS signals from GNSS satellites and a potential strong interference portion from the interfering signal source 106.

The GNSS anti-jammer 101 includes a summer 119 and an interference isolator 134. The interference isolator 134 isolates the strong interference portion from the received signals and provides the isolated strong interference portion to the summer 119. The summer 119 then subtracts the strong interference portion from the receive signals. Accordingly, the summer 119 may provide a signal that is similar to the received signals from the GNSS satellites. In some embodiments, the interference isolator 134 may also produce a noise measurement that is equal to noise generated within the interference isolator 134.

In certain embodiments, the GNSS anti-jammer 101 may also include a local noise remover 108. The local noise remover 108 may be a processor that receives the summed signal from the summer 119 and an estimate of noise generated by the interference isolator 134. The local noise remover 108 may remove the noise from the summed signal by subtracting the noise estimate from the summed signal. The local noise remover 108 may provide an output signal for the GNSS anti-jammer 101 to a GNSS receiver 103. The GNSS receiver 103 uses the received signal to provide GNSS solutions 105.

Figure 2:
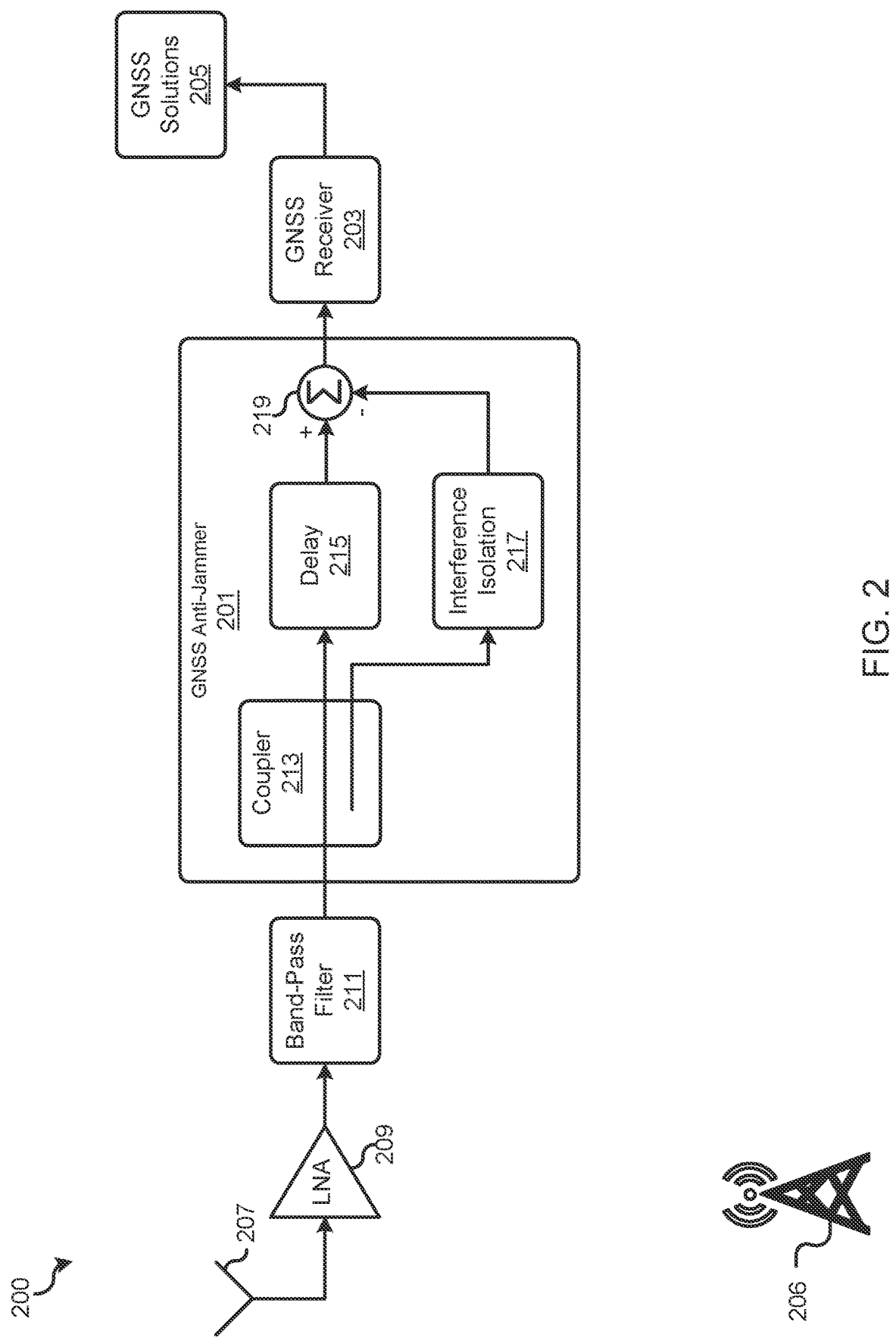
FIG. 2 is a block diagram illustrating a system for providing GNSS anti-jamming using interference cancellation according to an aspect of the present disclosure.

FIG. 2 is block diagram illustrating a system 200 for providing GNSS anti-jamming using interference cancellation. The system 200 includes GNSS anti-jammer 201 that functions similarly to the GNSS anti-jammer 101 in FIG. 1. The system 200 receives signals through an antenna 207, where the antenna 207 functions similarly to the antenna 107 in FIG. 1. The system 200 may also include an LNA 209 that amplifies the signals received through the antenna 207 while limiting the introduction of noise into the amplified signals. Additionally, the system 200 may include a band-pass filter 211 that filters out RF energy at frequencies outside of a passband associated with the GNSS signals. The band-pass filter 211 provides the filtered received signals to the GNSS anti-jammer 201 to remove potential interfering signals received from the interfering signal sources 206.

As discussed above in FIG. 1, the GNSS anti-jammer 201 cancels the interfering signals such that the GNSS receiver 203 can receive the GNSS signals absent the received interfering signals when calculating GNSS solutions 205. The GNSS anti-jammer 201 includes a coupler 213. The coupler 213 receives the filtered signal from the band-pass filter 211 through an input port and couples portions of the received filtered signal to different output ports. For example, the coupler 213 may couple fifty percent of the power to one output port and fifty percent of the power to the other output port.

In exemplary embodiments, the GNSS anti-jammer 201 includes a delay path 215 coupled to one of the output ports of the coupler 213 and an interference isolation path 217 coupled to the other output port of the coupler 213. On the interference isolation path 217, the GNSS anti-jammer 201 functions similarly to the interference isolator 134 in FIG. 1. Along the interference isolation path 217, the GNSS anti-jammer 201 isolates the interfering signals from the interfering signal sources 206 by removing portions of the received signals associated with the GNSS satellites. Accordingly, the output of the interference isolation path 217 may be the portions of the signal that are associated with the signals from the interfering signal sources 206. On the delay path 215, the GNSS anti-jammer 201 may delay the signal by an amount of time associated with the time it takes for signals to pass through the interference isolation path 217. Accordingly, signals take the same time to pass through the delay path 215 and the interference isolation path 217 (signals are coherent).

In some embodiments, the GNSS anti-jammer 201 includes a summer 219 that adds different input signals into a single output. In some embodiments, the summer 219 may also negate one of the inputs to subtract the negated signal from the other non-negated signal. In the GNSS anti-jammer 201, the summer 219 may sum the output of the delay path 215 as a first input and the negated output of the interference isolation path 217 as a second input. Accordingly, the summer 219 may subtract the signals from the interfering signal sources 206 from the signals received through the antenna 207. Thus, the output summed signals of the summer 219 substantially contain the desired GNSS signal without the undesired signals from the interfering signal sources 206. The GNSS anti-jammer 201 provide the output from the summer 219 as an output for the GNSS anti-jammer 201.

The GNSS receiver 203 receives the output from the GNSS anti-jammer 201. As the output from the GNSS anti-jammer 201 has removed the signals from the interfering signal sources 206, the signals from the interfering signal sources 206 may not affect the operation of the GNSS receiver 203. The GNSS receiver 203 may provide GNSS solutions 205 for use in the calculation of navigational information.

Figure 3:
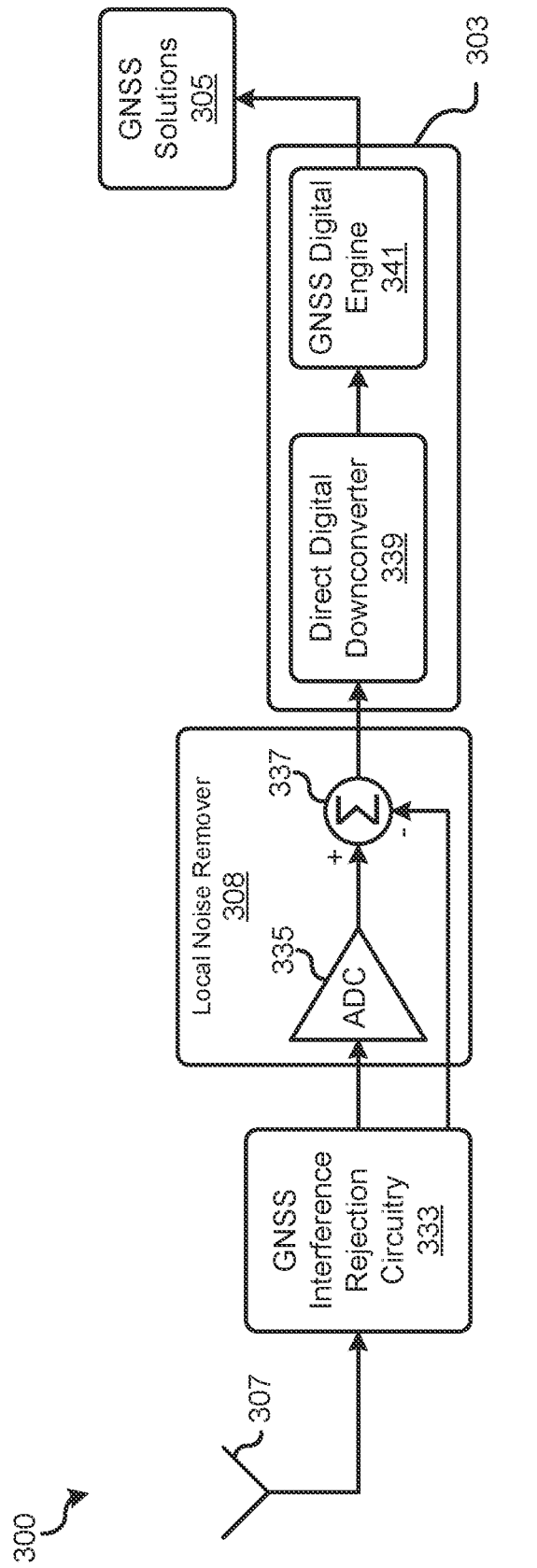
FIG. 3 is a block diagram illustrating a system for providing GNSS anti-jamming using interference cancellation according to an aspect of the present disclosure.

FIG. 3 is a block diagram illustrating an additional embodiment of a system 300 for providing GNSS anti jamming using interference cancellation. As illustrated, the system 300 includes GNSS interference rejection circuitry 333. The GNSS interference rejection circuitry 333 functions somewhat similarly to the GNSS anti-jammer 201 in FIG. 2. However, the GNSS interference rejection circuitry 333 may provide different outputs as compared to the single output lacking the interfering signals described above concerning the GNSS anti-jammer 201.

In exemplary embodiments, the GNSS interference rejection circuitry 333 receives signals through an antenna 307, where the antenna 307 is substantially similar to the antenna 107 in FIG. 1. As described above, the received signals may include signals from GNSS satellites and, potentially, interfering signals from interfering signal sources 306 that may be similar to the interfering signal source 106. The signal received through the antenna 307 may be equal to S(t) represented by the equation (1) described above.

In certain embodiments, the GNSS interference rejection circuitry 333 may provide two outputs from the received signals, an analog output $S_1(t)$ and a digital output $\widetilde{w_{\theta 2}(n)}$. The analog output $S_1(t)$ may be equal to S(t) minus the interfering signals but with added quantization noise. For example, $S_1(t)$ may be represented by the following equation:

$$S_1(t)=P_sD(t)C(t)\cos(2\pi f_c t+\varnothing)+w_{\ominus 1}(t)-w_{\ominus 2}(t). \quad (2)$$

The analog output $S_1(t)$ may be provided to a local noise remover 308 that may function similar to the local noise remover 108 in FIG. 1. The local noise remover 308 may include an ADC 335 and a digital summer 337. The ADC 335 may convert the analog output $S_1(t)$ to a digital signal $S_1(n)$. The ADC 335 provides the output digital signal $S_1(n)$ to a digital summer 337.

In addition to the analog output $S_1(t)$, the GNSS interference rejection circuitry 333 may provide a digital output $w_{32}(n)$ that represents a quantization noise. The GNSS interference rejection circuitry 333 may provide the digital output $w_{32}(n)$ to the digital summer 337 in the local noise remover 308. The digital summer 337 subtracts the digital output $w_{32}(n)$ of the GNSS interference rejection circuitry 333 from the output digital signal $S_1(n)$ from the ADC 335 to produce a summed output $S_2(n)$. The summed output $S_2(n)$ may be substantially equal to digitized versions of the signals received through the antenna 307 without interfering signals produced by the interfering signal sources 306. Thus, the digital summer 337 may function within the local noise remover 308 to remove noise generated by the GNSS interference rejection circuitry 333 from the signal provided by the ADC 335.

The system 300 also includes a GNSS receiver 303 that functions similarly to the GNSS receiver 203. In some implementations, the GNSS receiver 303 may include a direct digital downconverter 339 and a GNSS digital engine 341. The direct digital downconverter 339 receives the digital output from the digital summer 337. The direct digital downconverter 339 converts the summer output to a digital baseband signal for use by the GNSS digital engine 341. The GNSS digital engine 341 processes the digitized GNSS signals to calculate GNSS navigational information. The GNSS digital engine 341 then provides GNSS solutions 305 for use by a larger navigation system, or for use by another system or device. The removal of the interfering signals reduces the impact of the interference on the GNSS solutions 305.

Figure 4:
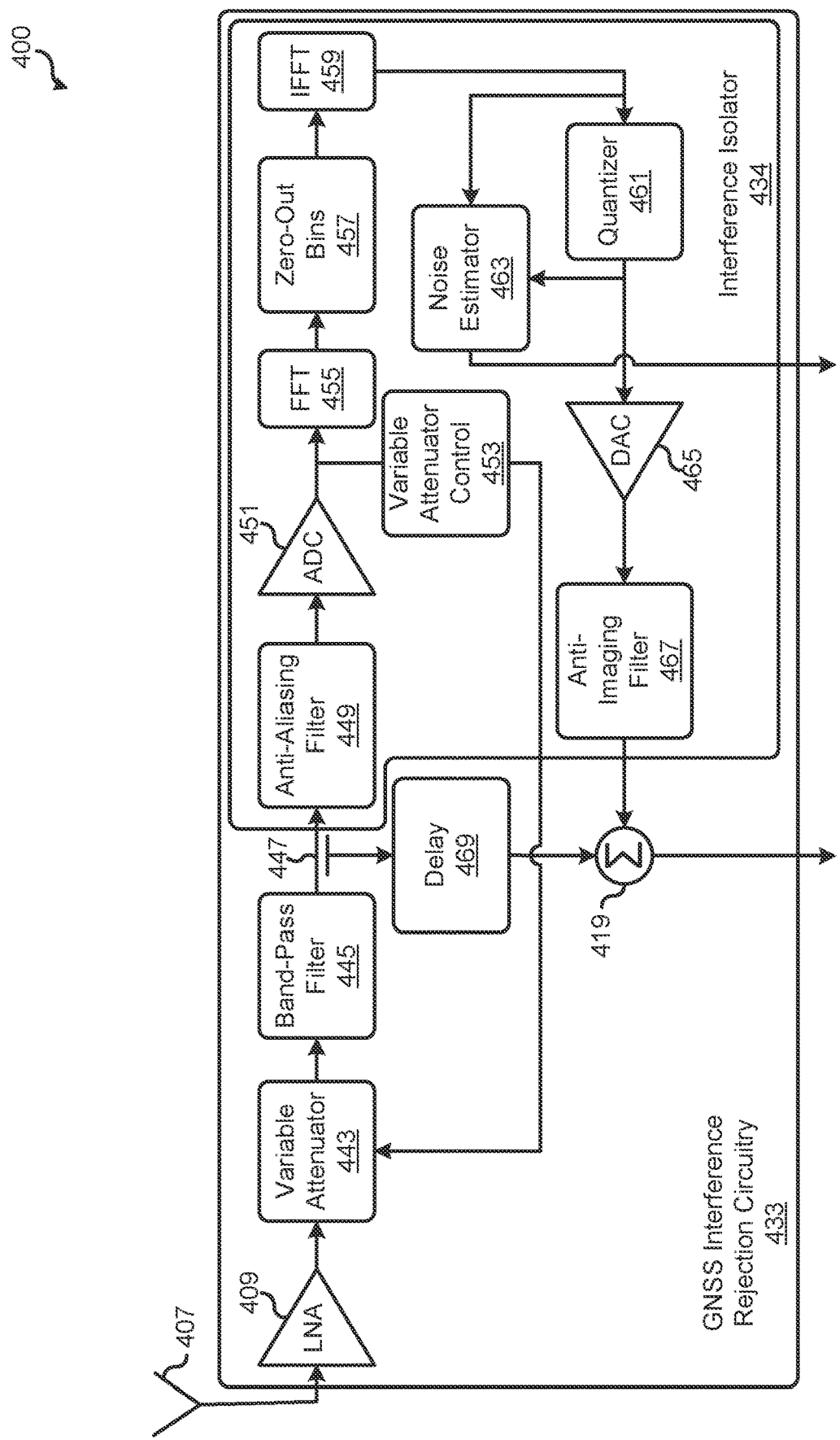
FIG. 4 is a block diagram illustrating a system for providing GNSS anti-jamming using interference cancellation according to an aspect of the present disclosure.

FIG. 4 is a block diagram of system 400 that illustrates a detailed embodiment of GNSS interference rejection circuitry 433 that functions similarly to the GNSS interference rejection circuitry 333 in FIG. 3. Similar to the GNSS interference rejection circuitry 333, the GNSS interference rejection circuitry 433 receives a signal from an antenna 407 that functions similarly to the antenna 307. Similarly, the GNSS interference rejection circuitry 433 provides an output to local noise remover such as the local noise remover 308.

In exemplary embodiments, the GNSS interference rejection circuitry 433 couples the signal from the antenna 407 into an LNA 409. The LNA 409 may function similarly to the LNA 209 in FIG. 2. The GNSS interference rejection circuitry 433 may couple the output of the LNA 409 into a variable attenuator 443. The variable attenuator 443 ensures that the signal provided by the variable attenuator 443 is within a dynamic range of an ADC, like the ADC 451. While the GNSS interference rejection circuitry 433 may remain functional when a strong signal causes components of the GNSS interference rejection circuitry 433 to operate nonlinearly, the GNSS interference rejection circuitry 433 may prevent damage to components of the LASS interference rejection circuitry 433 due to the reception of strong signals.

In further embodiments, the GNSS interference rejection circuitry 433 couples the output of the variable attenuator 443 into a band-pass filter 445. The band-pass filter 445 may function similarly to the band-pass filter 211 in FIG. 2. Also, the GNSS interference rejection circuitry 433 includes a coupler 447 that functions similarly to the coupler 213 in FIG. 2. The coupler 447 couples a portion of the filtered signal into the delay 469 and a portion into an interference isolation path that functions like the interference isolation path 217. As the interference isolation path includes multiple electronic components, the delay 469 may be analog circuitry that delays a signal so that the portion of the signal passing through the delay 469 and the portion of the signal passing through the interference isolation path are equal in phase or are time aligned upon arrival at an analog summer 419.

In certain embodiments, the GNSS interference rejection circuitry 433 includes an interference isolator 434. The interference isolator 434 includes components associated with the interference isolation path. For example, the interference isolator 434 includes components on the signal path between an anti-aliasing filter 449 and an anti-imaging filter 467. The anti-aliasing filter 449 may receive the input from the coupler 447 and filter noise outside the Nyquist band before converting the signal to the digital domain. After performing the anti-aliasing filtering, an ADC 451 may convert the RF, analog, received signals to the digital domain to create a digital GNSS signal. In some embodiments, after digitization, a variable attenuator control 453 may monitor the signal for determining whether or not to attenuate the received signal due to the strength of the signal and how much the received signal should be attenuated. The variable attenuator control 453 may then direct the operation of the variable attenuator 443.

In additional embodiments, the output of the ADC 451 may be coupled into the input of a fast Fourier transform (FFT) 455. The FFT 455 may transform the digitized signal into the frequency domain and provide the output to the zero-out bins 457. The zero-out bins 457 may identify the frequency bins with the strongest signals (associated with the strong interference portion) and zero out the other bins (associated with the weak portion) with a signal power less than a determined power level threshold. For example, the zero-out bins 457 may identify the frequency bin having the signal component of the largest magnitude and then zero out frequency bins with signal components having a signal power with magnitudes less than a threshold percentage of the largest magnitude. Alternatively, the zero-out bins 457 may identify an expected magnitude level associated with the highest expected magnitude for GNSS signals, where the zero-out bins 457 zeros out the frequency bins that are less than or equal to the highest expected magnitude for GNSS signals.

When the zero-out bins 457 has zeroed-out the different frequency bins, the zero-out bins 457 provides the signal to an inverse fast Fourier transform (IFFT) 459. The IFFT 459 transforms the signal in the frequency domain back into the time domain. The signal produced by the IFFT 459 may be substantially equal to $\widetilde{J(n)}$, a digital estimate of the interfering signal received from an interfering signal source, the digital estimate may also be referred to as the estimated strong interference portion of the received signals.

The GLASS interference rejection circuitry 433 may further include a quantizer 461. The quantizer 461 quantizes the estimated digital interfering signal equal to the number of bits used by a digital-to-analog converter (DAC), such as the subsequent DAC 465. The quantization of the estimated digital interfering signal may be represented by $\widetilde{J(n)} + w_{\partial 2}(n)$, where the $w_{\partial 2}(n)$ represents quantization noise having a variance of $\partial_2$ and a mean of $\mu_2$. To remove the noise introduced by the quantizer 461, the GNSS interference rejection circuitry 433 may also include a noise estimator 463. The noise estimator 463 estimates the quantization noise by identifying the difference between the estimated digital interfering signal before quantization and the estimated digital interfering signal after quantization by the quantizer 461. The noise estimator 463 then provides a quantization noise estimate $\widetilde{w_{\partial 2}(n)}$ to a digital summer such as the digital summer 337 shown in FIG. 3, where the digital summer 337 subtracts the quantization noise estimate $\widetilde{w_{\partial 2}(n)}$ from another signal.

In exemplary embodiments, after quantization by the quantizer 461, the DAC 465 may convert the quantized signal back into the analog domain. The GNSS interference rejection circuitry 433 may also include an anti-imaging filter 467. The anti-imaging filter 467 is a low-pass filter that filters out higher frequency images of the signal caused by the digital-to-analog conversion. The GNSS interference rejection circuitry 433 may provide the output of the anti-imaging filter 467, which represents the interfering signal and quantization noise, to the analog summer 419. The analog summer 419 subtracts the output of the anti-imaging filter 467 from the signal provided by the delay 469 to produce the analog output $S_1(t)$. Accordingly, the GNSS interference rejection circuitry 433 may produce an analog output $S_1(t)$ and a digital output $w_{\partial 2}(n)$ as described above concerning the GNSS interference rejection circuitry 333 in FIG. 3.

In certain embodiments, the GNSS interference rejection circuitry 433 may include a processor and a memory unit, where the memory unit stores information that can aid the processor when performing some of the functions of the GNSS interference rejection circuitry 433. For example, a processor may perform some of the digital operations of the GNSS interference rejection circuitry 433, like the FFT 455, zero-out bins 457, IFFT 459, quantizer 461, and the noise estimator 463. The processor may also perform other functions that may include the digital summer 337, the direct digital downconverter 339, the GNSS digital engine 341, among other digital operations.

The processor may be implemented using software, firmware, hardware, or other appropriate combinations thereof. The processor and/or other computational devices may be supplemented by, or incorporated in, specially designed application-specific integrated circuits (ASICs) or field programmable gate arrays (FPGAs). The processor may be a general or special purpose computer or processor, or other programmable logic devices. The processor and other competition devices may also include or function with software programs, firmware, or other computer-readable instructions for carrying out various process tasks, calculations, and control functions used in the present methods and systems.

Further, computer-executable instructions (such as program modules or components) may implement the methods described in this description. At least one processor may execute the computer-executable instructions. Software, firmware, or other execution-capable devices may execute the computer-readable instructions for carrying out various process tasks, calculations, and generation of data used in the operations of the described methods. The computer-readable instructions may be stored as part of one or more appropriate computer-program products, where a computer-program product may be a set of computer-readable instructions or data structures stored on a computer-readable medium. The computer-readable medium may be a media that stores data that can be accessed by the processor or other computing device. In certain implementations, the computer-readable medium may form part of a memory unit.

Computer-readable mediums may include non-volatile memory devices. Non-volatile memory devices may include semiconductor memory devices such as random access memory (RAM), read-only memory (ROM), electrically erasable programmable ROM (EEPROM), or flash memory devices. The non-volatile memory devices may also include magnetic disks (such as internal hard disks or removable disks), optical storage devices (such as compact discs (CDs), digital versatile discs (DVDs), Blu-ray discs), or other media that can store computer-executable instructions or data structures.

Figure 5:
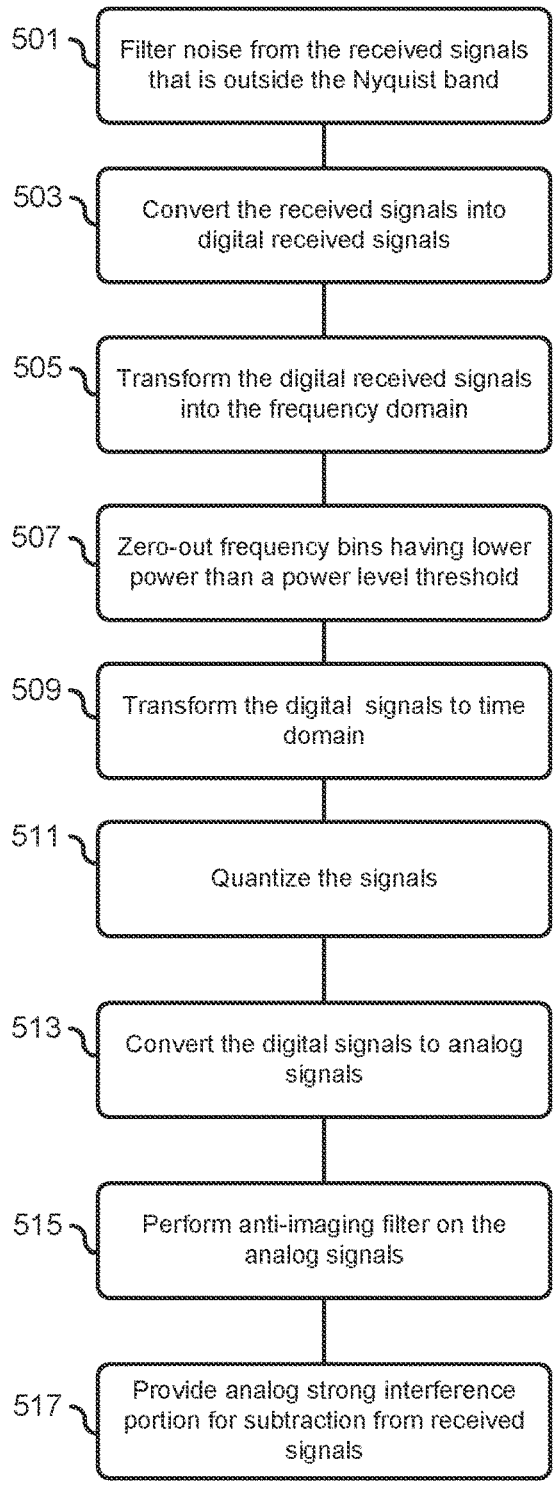
FIG. 5 is a flowchart diagram of a method for isolating an interfering signal according to an aspect of the present disclosure.

FIG. 5 is a flowchart diagram of a method 500 performed by an interference isolator to isolate a strong interference portion from the signals received through an antenna. The interference isolator may function similar to the interference isolator 134 and the interference isolator 434. The method 500 proceeds at 501, where noise is filtered from the received signals outside the Nyquist band. The filtering can be performed as described above concerning the anti-aliasing filter 449 in FIG. 4. Additionally, the method 500 proceeds at 503, where the received signals are converted into digital received signals. For example, an ADC like the ADC 451 in FIG. 4 may convert the analog filtered signal into a digital signal for processing by a processor.

In additional embodiments, the method 500 proceeds at 505, where the digital received signals are transformed into the frequency domain. For example, a processor may perform an FFT, a Z transform, a Laplace transform, a wavelet transform, or other type of frequency-domain method on the digital samples of the received signal. When in the frequency domain, the method 500 proceeds at 507, where frequency bins having a lower power than a power level threshold are zeroed-out. By zeroing out the frequency bins, having the lower power levels, the processor is removing frequency components that are not associated with the strong interference portion. The method 500 then proceeds to 509, where the digital signals are transformed into the time domain. For example, the processor may perform an IFFT, an inverse Z transform, an inverse Laplace transform, an inverse wavelet transform, or other transform for transforming the domain for signals into the time domain.

In some embodiments, when the signals are in the time domain, the method 500 proceed at 511, where the digital signals are quantized. As discussed above, quantization changes the bits within a signal to prepare the signal to have the correct number of bits for conversion by a DAC. Accordingly, after quantization, the method 500 proceeds at 513, where the digital signals are converted to analog signals. After conversion, the method 500 proceeds at 515, where anti-imaging filtering is performed on the analog signals. After performing the anti-imaging filtering, the interference isolator proceeds at 517, where an analog strong interference portion is provided for subtraction from the received signals.

Figure 6:
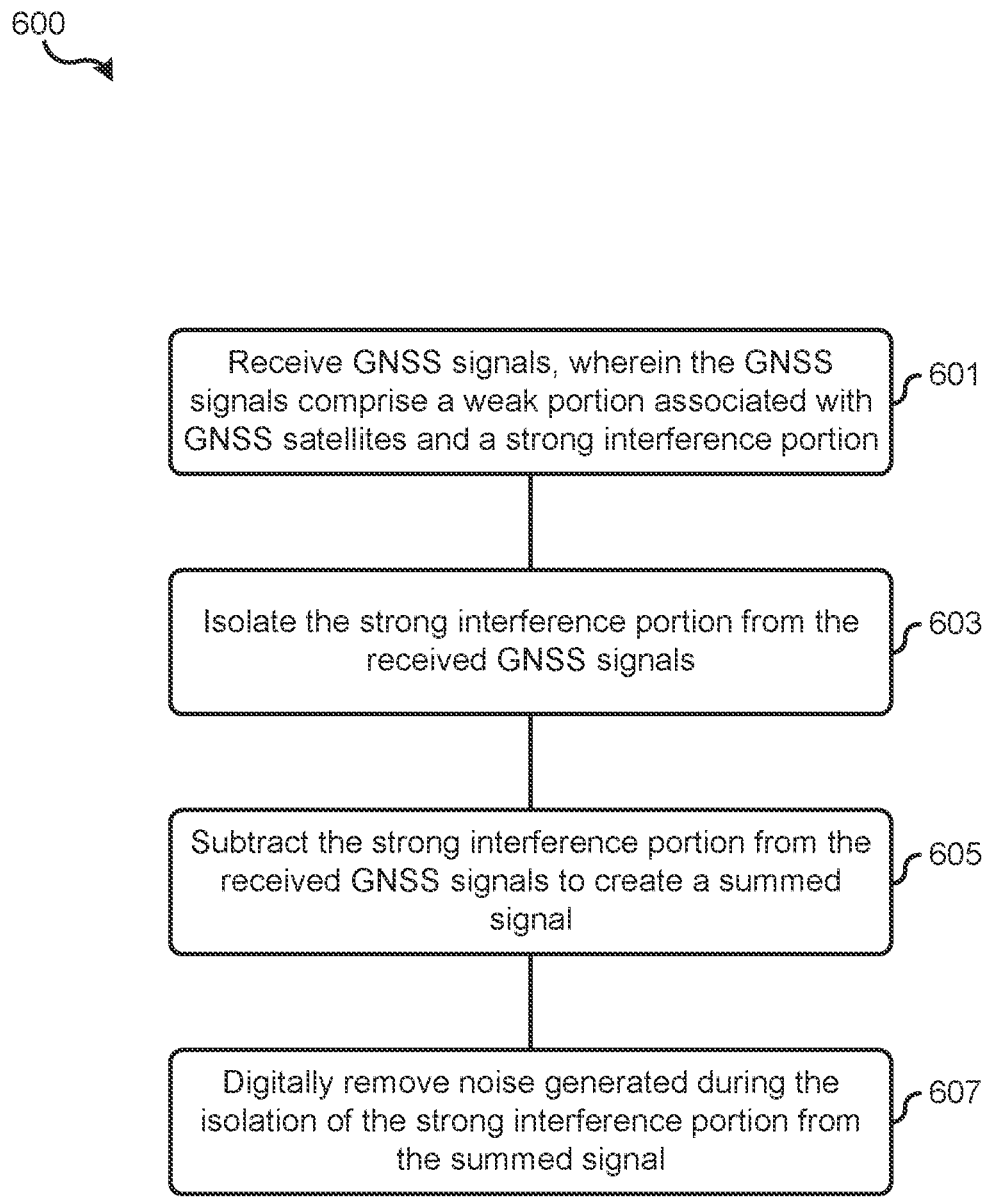
FIG. 6 is a flowchart diagram of a method for providing GNSS anti-jamming using interference cancellation according to an aspect of the present disclosure.

FIG. 6 is a flowchart diagram of a method 600 for providing GNSS anti-jamming using interference cancellation. The method 600 may proceed at 601, where signals are received, wherein the signals comprise a weak portion associated with GNSS satellites and a strong interference portion. Further, the method 600 may proceed at 603, where the strong interference portion is isolated from the received signals. Also, the method 600 may proceed at 605, where the strong interference portion is subtracted from the received signals to create a summed signal. Moreover, the method 600 may proceed at 607, where the noise generated during the isolation of the strong interference portion is digitally removed from the summed signal.

EXAMPLE EMBODIMENTS

Example 1 includes a system comprising: an antenna that receives signals, wherein the signals comprise a weak portion associated with one or more GNSS satellites and a strong interference portion from an interfering signal source; a GNSS anti-jammer comprising: an interference isolator that receives the received signals and provides an estimated strong interference portion as an output; a summer that subtracts the estimated strong interference portion from the received signals to create a summed signal; and a local noise remover that removes noise generated by the interference isolator from the stunned signal, wherein the local noise remover is a processor that digitally removes the noise; and a GNSS receiver coupled to receive the summed signal from the local noise remover.

Example 2 includes the system of Example 1, wherein the interference isolator includes an analog-to-digital converter to convert the received signals into digital signals.

Example 3 includes the system of Example 2, wherein the interference isolator: performs a fast Fourier transform on the digital signals; removes the weak portion of the digital signals to isolate the strong interference portion to create the estimated strong interference portion; and performs an inverse fast Fourier transform on the estimated strong interference portion.

Example 4 includes the system of Example 3, wherein the interference isolator removes the weak portion by setting frequency bins to zero that have a signal power less than a determined power level threshold.

Example 5 includes the system of any of Examples 1-4, wherein the interference isolator comprises a quantizer to quantize the estimated strong interference portion to a number of bits used by a digital-to-analog converter.

Example 6 includes the system of Example 5, wherein the interference isolator comprises a noise estimator to estimate the noise, wherein the noise is introduced by the quantizer into the estimated strong interference portion.

Example 7 includes the system of Example 6, wherein the local noise remover is a digital summer that subtracts the estimated noise from the summed signal.

Example 8 includes the system of any of Examples 1-7, wherein the summer is an analog summer.

Example 9 includes the system of any of Examples 1-8, wherein the interference isolator comprises a variable attenuator control that attenuates the received signals based on a detected signal strength of the received signals.

Example 10 includes the system of any of Examples 1-9, further comprising a delay that delays the received signals that is an input for the summer by a time used by the interference isolator to isolate the strong interference portion.

Example 11 includes a method comprising: receiving signals, wherein the received signals comprise a weak portion associated with one or more GNSS satellites and a strong interference portion; isolating the strong interference portion from the received signals; subtracting the strong interference portion from the received signals to create a summed signal; and digitally removing noise generated during the isolation of the strong interference portion from the summed signal.

Example 12 includes the method of Example 11, further comprising converting the received signals into digital signals.

Example 13 includes the method of Example 12, further comprising: performing a fast Fourier transform on the digital signals; removing the weak portion of the digital signals to isolate the strong interference portion to create an estimated strong interference portion; and performing an inverse fast Fourier transform on the estimated strong interference portion.

Example 14 includes the method of Example 13, wherein removing the weak portion comprises setting frequency bins to zero that have a signal power less than a determined power level threshold.

Example 15 includes the method of any of Examples 11-14, further comprising quantizing an estimate of the strong interference portion to a number of bits used by a digital-to-analog converter.

Example 16 includes the method of Example 15, further comprising estimating the noise introduced during the quantization of the estimated strong interference portion.

Example 17 includes the method of Example 16, wherein digitally removing the noise comprises digitally subtracting the estimated noise from the summed signal.

Example 18 includes the method of any of Examples 11-17, further comprising attenuating the received signals based on a detected signal strength of the received signals.

Example 19 includes the method of any of Examples 11-18, further comprising delaying the received GNSS signal from which the strong interference portion is subtracted by a time used to isolate the strong interference portion.

Example 20 includes a system comprising: an antenna that receives signals, wherein the received signals comprise a weak portion associated with one or more GNSS satellites and a strong interference portion; an interference isolator that receives the received signals as an input and provides an estimated strong interference portion as an output, wherein the interference isolator: converts the received signals into digital signals; performs a fast Fourier transform on the digital signals; removes the weak portion of the digital signals to isolate the strong interference portion to create the estimated strong interference portion; performs an inverse fast Fourier transform on the estimated strong interference portion; quantizes the estimated strong interference portion to a number of bits used by a digital-to-analog converter; estimates noise generated during quantization of the estimated strong interference portion; and converts the estimated strong interference portion to an analog estimated strong interference portion; a summer that subtracts the analog estimated strong interference portion from the received signals to create a summed signal; a local noise remover that digitally removes the estimated noise from the summed signal; and a GNSS receiver coupled to receive the summed signal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system comprising:
    an antenna that receives signals, wherein the signals comprise a weak portion associated with one or more GNSS satellites and a strong interference portion from an interfering signal source;
    GNSS interference rejection circuitry comprising:
        an interference isolator that receives the received signals and provides an estimated strong interference portion as a first output and a quantization noise estimate as a second output, wherein the interference isolator is configured to:
            convert the received signals into digital signals;
            execute a fast Fourier transform on a digital signal in the digital signals;
            remove the weak portion of the digital signal from the digital signal to create the estimated strong interference portion by setting frequency bins of the transformed digital signal to zero that have a signal power less than a power level threshold, wherein the power level threshold is set based on at least one of a threshold percentage of a signal component having a largest magnitude, and an expected highest magnitude for a GNSS signal; and
            execute an inverse fast Fourier transform on the estimated strong interference portion;
            quantize the estimated strong interference portion to a number of bits used by a digital-to-analog converter;
            estimate the noise introduced into the estimated strong interference portion by quantization to generate the quantization noise estimate; and
            convert the quantized estimated strong interference portion to an analog estimated strong interference portion;
        a summer that subtracts the analog estimated strong interference portion from the received signals to create a summed signal; and
        a local noise remover that converts the summed signal into a digital summed signal and subtracts the quantization noise estimate from the digital summed signal; and
    a GNSS receiver coupled to receive the digital summed signal from the GNSS interference rejection circuitry as produced by the local noise remover.

2. The system of claim 1, wherein the interference isolator comprises a variable attenuator control that attenuates the received signals based on a detected signal strength of the received signals.

3. The system of claim 1, further comprising a delay that delays the received signals that are an input for the summer by a time used by the interference isolator to isolate the strong interference portion.

4. A method comprising:
    receiving signals through at least one antenna, wherein the received signals comprise a weak portion associated with one or more GNSS satellites and a strong interference portion;
    isolating the strong interference portion from the received signals by an interference isolator, wherein isolating the strong interference portion by the interference isolator comprises:
        converting the received signals into digital signals;
        performing a fast Fourier transform on the digital signals;
        removing the weak portion from the digital signals to create an estimated strong interference portion by setting frequency bins of the transformed digital signal to zero that have a signal power less than a power level threshold, wherein the power level threshold is at least one of a threshold percentage of a signal component having a largest magnitude and an expected highest magnitude for a GNSS signal;
        performing an inverse fast Fourier transform on the estimated strong interference portion;
        quantizing the estimated strong interference portion to a number of bits used for digital-to-analog conversion;
        generating a quantization noise estimate of the noise introduced into the estimated strong interference portion by the quantizer; and
        converting the quantized estimated strong interference portion to an analog strong interference portion;
    subtracting the analog strong interference portion from the received signals by a summer to create a summed signal;
    converting the summed signal into a digital summed signal at a local noise remover; and
    subtracting the quantization noise estimate from the digital summed signal at the local noise remover.

5. The method of claim 4, further comprising attenuating the received signals based on a detected signal strength of the received signals.

6. The method of claim 4, further comprising delaying the received GNSS signal from which the strong interference portion is subtracted by a time used to isolate the strong interference portion.

7. A system comprising:
    an antenna that receives signals, wherein the received signals comprise a weak portion associated with one or more GNSS satellites and a strong interference portion;
    an interference isolator that receives the received signals as an input and provides an estimated strong interference portion as an output, wherein the interference isolator is configured to:

convert the received signals into digital signals;
perform a fast Fourier transform on the digital signals;
remove the weak portion of the Fourier transformed digital signals to create the estimated strong interference portion by setting frequency bins of the Fourier transformed digital signal to zero that have a signal power less than a power level threshold, wherein the power level threshold is at least one of a threshold percentage of a signal component having a largest magnitude and an expected highest magnitude for a GNSS signal;
perform an inverse fast Fourier transform on the estimated strong interference portion;
quantize the estimated strong interference portion to a number of bits used by a digital-to-analog converter;
estimate noise generated during quantization of the estimated strong interference portion to generate a quantization noise estimate; and
convert the estimated strong interference portion to an analog estimated strong interference portion;

a summer that subtracts the analog estimated strong interference portion from the received signals to create a summed signal;

a local noise remover that digitally converts the summed signal into a digital summed signal and subtracts the quantization noise estimate from the digital summed signal; and a GNSS receiver coupled to receive the digital summed signal.

\* \* \* \* \*